United States Patent [19]

Nagaoka et al.

[11] 4,305,649
[45] Dec. 15, 1981

[54] INHIBIT CIRCUIT FOR AN ELECTRONIC FLASH CHARGE CIRCUIT

[75] Inventors: Shinji Nagaoka; Yuzuru Takazawa, both of Yotsukaido, Japan

[73] Assignee: Seiko Koki Kabushiki Kaisha, Tokyo, Japan

[21] Appl. No.: 143,875

[22] Filed: Apr. 25, 1980

[30] Foreign Application Priority Data

Apr. 28, 1979 [JP] Japan .................................. 54-52862

[51] Int. Cl.³ .............................................. G03B 7/26
[52] U.S. Cl. .................................................. 354/139
[58] Field of Search ....................... 354/50, 27, 30, 33, 354/34, 60 F, 29, 43, 133, 139, 149; 315/241 P

[56] References Cited
U.S. PATENT DOCUMENTS 3,810,212  5/1974  Biber .................................... 354/149
4,131,351 12/1978  Iwata ................................. 354/60 F
4,162,836  7/1979  Harrison ............................... 354/139
4,201,463  5/1980  Harigaya .............................. 354/149

Primary Examiner—L. T. Hix
Assistant Examiner—Stafford D. Schreyer
Attorney, Agent, or Firm—Robert E. Burns; Emmanuel J. Lobato; Bruce L. Adams

[57] ABSTRACT

In a camera of the type including an electronic flash light unit with an oscillating circuit and an electronic shutter which are both supplied with power from a common power supply, an inhibit circuit for an electric flash charge circuit is provided in which a base of the transistor in the oscillating circuit is connected to the output terminal of the exposure control circuit via a semi-conductor switching element. The semi-conductor switching element stops oscillation in the electric flash charge circuit while the exposure control circuit is in operation.

3 Claims, 2 Drawing Figures

INHIBIT CIRCUIT FOR AN ELECTRONIC FLASH CHARGE CIRCUIT

BACKGROUND OF THE INVENTION

This invention relates to a camera control circuit in which one common power supply is used to power both an exposure control circuit and an electric flash charging circuit.

In a camera in which one common power supply is applied to an exposure control circuit including a light measurement circuit, a battery check circuit, a shutter control circuit, etc. as well as to an electric flash circuit, some errorneous operations are made in the exposure control circuit due to some variations in the voltage of the power supply caused by an excessive current in the oscillating circuit of the electric flash circuit.

SUMMARY OF THE INVENTION

An object of the present invention is to obtain a stable operation of the exposure control circuit by terminating oscillation of the oscillating circuit for the electric flash and by eliminating some variations of the voltage from the common power supply while the exposure control circuit is operated.

Another object of the present invention is to reduce the time required from completion of the photographing up to the recharging. That is, charging for the electric flash circuit is started for the subsequent flash photographing at the same time as the completion of operation of the exposure control circuit.

DETAILED DESCRIPTION OF THE INVENTION

Figure 1:
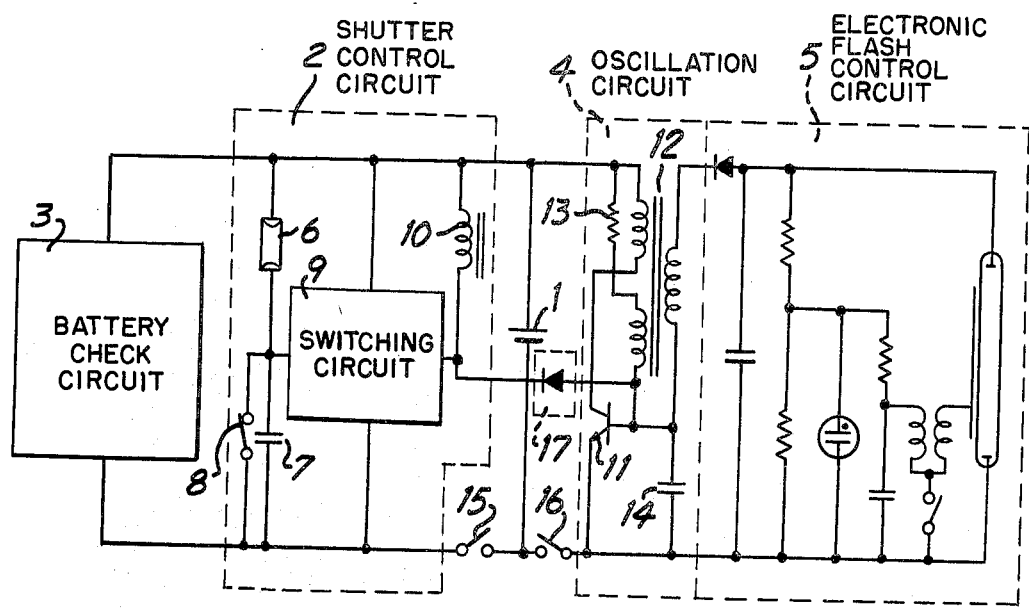
FIGS. 1 and 2 show preferred embodiments of the present invention.

Now referring to the drawings, one preferred embodiment of the present invention will be described in detail with reference to FIG. 1.

In FIG. 1, reference numeral 1 indicates a power supply used to power both the exposure control circuit and the electric flash circuit, reference numeral 2 shows a shutter control circuit which is composed of a light receiving element 6, an integration capacitor 7, a switch 8 to be turned off in synchronization with the starting of the exposure, and a switching circuit 9 having as its input a connection point between the light receiving element 6 and the capacitor 7 and having as its output terminal one terminal of an electro-magnet 10 for use in controlling the exposure termination time. Reference numeral 3 shows a battery check circuit which may be replaced with other circuits, for example, a light measurement calculation circuit, an auto-focusing circuit, etc. The exposure control circuit is formed by the shutter control circuit 2 and the battery check circuit 3. Reference numeral 4 indicates an oscillation circuit which is composed of an oscillating transistor 11, a winding 12 for use in oscillation and increasing the voltage, a resistor 13 and a capacitor 14. Reference numeral 5 indicates an electric flash control circuit and the description thereof will be eliminated due to its well known arrangement. The electric flash circuit is comprised of the oscillation circuit 4 and the electric flash control circuit 5. Reference numeral 15 indicates a power supply switch for the exposure control circuit and reference numeral 16 shows a power supply switch for the electric flash circuit. Reference numeral 17 indicates a semi-conductor switching means connected to the output terminal of the switching circuit 9 and the base terminal of the oscillation transistor. In the preferred embodiment of the present invention, the switching means comprises a diode.

The operation of the present arrangement shown in FIG. 1 will be described. When the power supply switch 16 for the electric flash circuit is turned on, the transistor 11 is energized to commence oscillation and charging of the main capacitor of the electric flash control circuit 5 is performed via winding 12.

Then, a release button of the camera (not shown) is depressed and when the power supply switch 15 for the exposure control circuit is turned on, the exposure control circuit is supplied with power. At this time, the potential at the output terminal in the switching circuit 9 goes to approximately zero potential, and in order to energize the electromagnet 10 and also to decrease the potential at the base of the transistor 11 via diode 17, the transistor 11 is cut off to terminate the oscillation. In this case, in order to provide a complete cut-off of the transistor 11, it is preferable to use a germanium diode having a forward voltage. In this way, in the preferred embodiment of the present invention, the moment the power supply switch 15 is turned on, the oscillation of the oscillating circuit is terminated and the power supply voltage is made to be stable, and thereby a light measuring operation, a battery checking operation or a shutter control operation may positively be performed without having any error at all. Then, the exposure operation is started and at the same time a trigger switch is turned on at a proper time to provide an illumination of the electric flash. When the switching circuit 9 performs a switching operation after an elapse of the desired exposure time, the potential at the output terminal is varied from the zero potential to the positive potential of the power supply voltage and the electro-magnet 10 is deenergized to terminate the exposure operation. At the same time, the diode 17 is placed in a reverse-biased condition to be cut-off, and then the oscillating transistor 11 starts again the oscillation. Thus, the charging of the main capacitor of the electric flash circuit is started again synchronization with the completion of the exposure.

It has been proposed to cut-off the oscillation transistor which is also applied as a switch or the power supply switch 15 cooperatively related to a depressing of the release button, but in this conventional system unless the release button is completely returned to its original position, the recharging function is not performed.

In the present invention, as previously described, the time required up to completion of the charging for the electric flash circuit for the subsequent photographing is extremely reduced due to the fact that the recharging is started in synchronization with the completion of the exposure, and in particular when a continuous photographing is to be performed, its effect may securely be provided.

Figure 2:
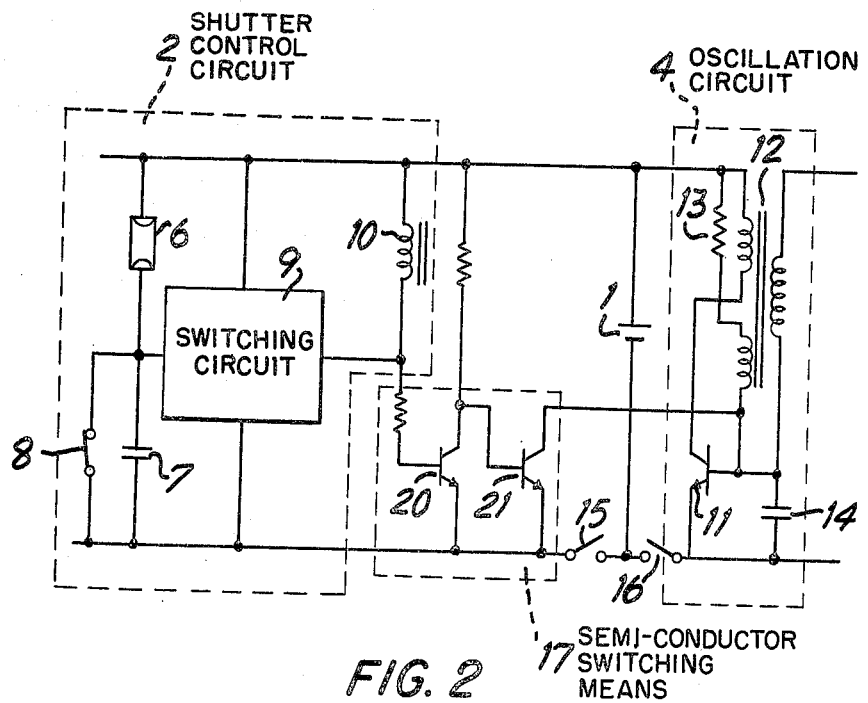

In FIG. 2 is shown another preferred embodiment in which a transistor is applied as a semi-conductor switching means. Like numerals are applied to like parts in both FIGS. 1 and 2. In this embodiment, during such time as the power supply switch 15 is turned on and the exposure control circuit is operated, the output terminal from the switching circuit 9 is substantially set to zero potential similar to the example of FIG. 1 to energize the electro-magnet 10 and then the transistor 20 of the semi-conductor switching means 17 is turned off and the transistor 21 is turned on to short circuit between the base and emitter of the oscillation transistor 11. Upon completion of the exposure operation, the potential at the output terminal of the switching circuit 9 is set to a positive potential, so that the transistor 20 is set to ON and the transistor 21 is set to OFF, a termination of the oscillation is released and a charging of the electric flash circuit is started.

The preferred embodiment shown in FIG. 2 is suitable for use in the electric flash circuit having a large guide number compared to the case in which a diode is used as the semi-conductor switching means as shown in FIG. 1. That is, in the electric flash circuit having a large guide number, the charging current is high in its value, so that the base current of the oscillation transistor 11 is also high, and therefore the forward voltage of the diode is also high and the cut-off condition of the oscillation transistor 11 becomes uncomplete. Since the voltage between the collector and the emitter of the transistor 21 is about 0.2 V, it is possible to provide a complete cut-off condition of the oscillation transistor 11.

In the present invention, a mechanical switch is not used for eliminating the oscillation and instead, a semi-conductor switching means is arranged between the shutter control circuit and the oscillation transistor so that the present invention is suitable for such a camera as an electro-magnetic type camera in which a series of operations starting from a light measurement and calculation to a shutter control are automatically performed. In this kind of camera, a light touch of the camera release and a short length of stroke are substantially essential, so that it is very hard to arrange such a switch for terminating oscillation which is operated in response to the camera release. In this respect, in the present invention, the arrangement of a semi-conductor switching means enables the proper operation of the circuit and the effectiveness of the present invention is achieved.

Further, the present invention may not only be limited to the preferred embodiments shown in the drawings but also has various applications. As one example, in case that a PNP transistor is used as an oscillation transistor, the object of the present invention is accomplished under an application of PNP transistor as semi-conductor switching means.

As described above, the application of the semi-conductor switch means may enable an application of a stable power supply to each of the control systems to be driven by a power supply in common with such electric flash circuits as an exposure control circuit and an auto-focusing circuit, etc. and thereby it is possible to improve the accuracy of performance of each of the control systems.

Since in the present invention the recharging of the electric flash circuit is started upon completion of the exposure, the time required to enable subsequent photographing is extremely reduced or decreased to provide a substantial effect on the continuous photographing using the electric flash.

We claim:

1. In a camera control circuit including an electro-magnet for controlling the exposure completion time, an exposure control circuit having a shutter control circuit for controlling the electro-magnet, an electric flash circuit having an oscillation transistor forming an oscillation circuit, and a power supply to be applied in common with said exposure control circuit and said electric flash circuit, the improvement comprising: a semi-conductor switching means arranged between the output terminal of the shutter control circuit for controlling said electro-magnet and the base of said oscillation transistor for keeping said oscillation transistor inoperative during the time in which said electro-magnet is energized.

2. A camera control circuit as set forth in claim 1; wherein said semi-conductor switching means comprises a diode.

3. A camera control circuit as set forth in claim 1; wherein said semi-conductor switching means comprises a transistor.

* * * * *